United States Patent [19]

Place

[11] Patent Number: 5,391,834
[45] Date of Patent: Feb. 21, 1995

[54] PROTECTIVE COVER FOR ELECTRIC CONTROLS

[75] Inventor: Donald E. Place, Mansfield, Ohio

[73] Assignee: Therm-O-Disc, Incorporated, Mansfield, Ohio

[21] Appl. No.: 176,845

[22] Filed: Jan. 3, 1994

[51] Int. Cl.⁶ .............................................. H02B 1/14
[52] U.S. Cl. ........................ 174/5 R; 174/138 F; 392/449; 361/622
[58] Field of Search ............... 174/5 R, 138 F; 219/267, 520, 522; 361/622; 392/449

[56] References Cited

U.S. PATENT DOCUMENTS

| | | | |
|---|---|---|---|
| 3,621,197 | 11/1971 | Place | 392/449 |
| 3,626,151 | 12/1971 | Them et al. | 392/449 |
| 3,914,660 | 10/1975 | Stearley | 361/809 |
| 3,914,661 | 10/1975 | Manecke et al. | 361/809 |
| 4,008,419 | 2/1977 | Stearley | 361/622 |
| 4,055,724 | 10/1977 | Manecke et al. | 174/66 |
| 4,543,445 | 9/1985 | Turner | 174/5 R |
| 4,554,616 | 11/1985 | McIntosh | 361/816 |
| 4,588,851 | 5/1986 | Turner | 174/5 R |
| 4,641,223 | 2/1987 | McIntosh | 361/816 |

*Primary Examiner*—Leo P. Picard
*Assistant Examiner*—David Tone
*Attorney, Agent, or Firm*—Jones, Day, Reavis & Pogue

[57] ABSTRACT

A protective cover for electrical controls has planar upper & lower portions separated by an offset portion that spaces the lower portion outwardly from the upper portion. An enlarged aperture in the upper portion adjacent the offset portion provides access to a temperature setting adjustment on the control. Latches project rearwardly from the upper portion adjacent the aperture and an apertured tongue projects rearwardly from the top end of the cover for attaching the cover to the control.

13 Claims, 7 Drawing Sheets

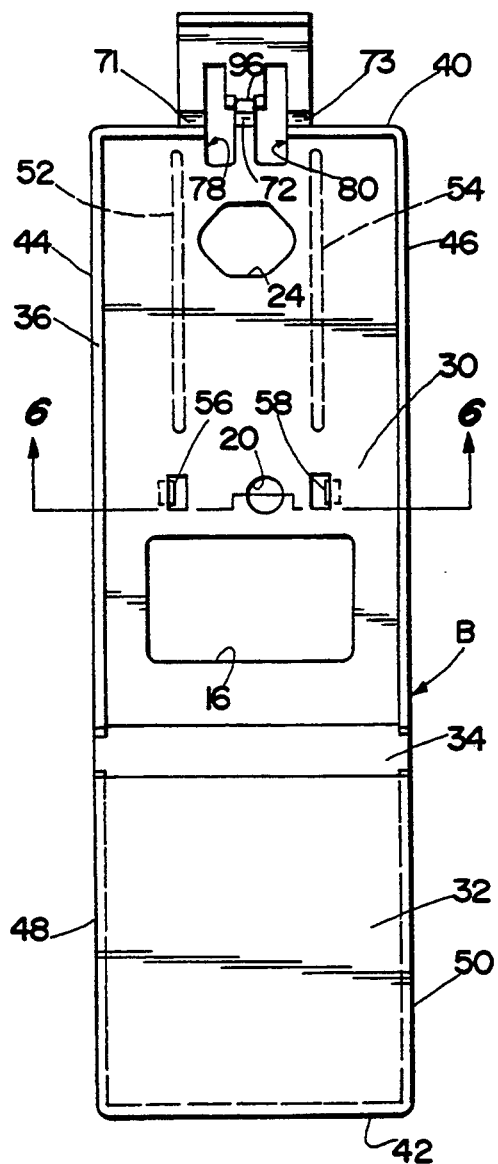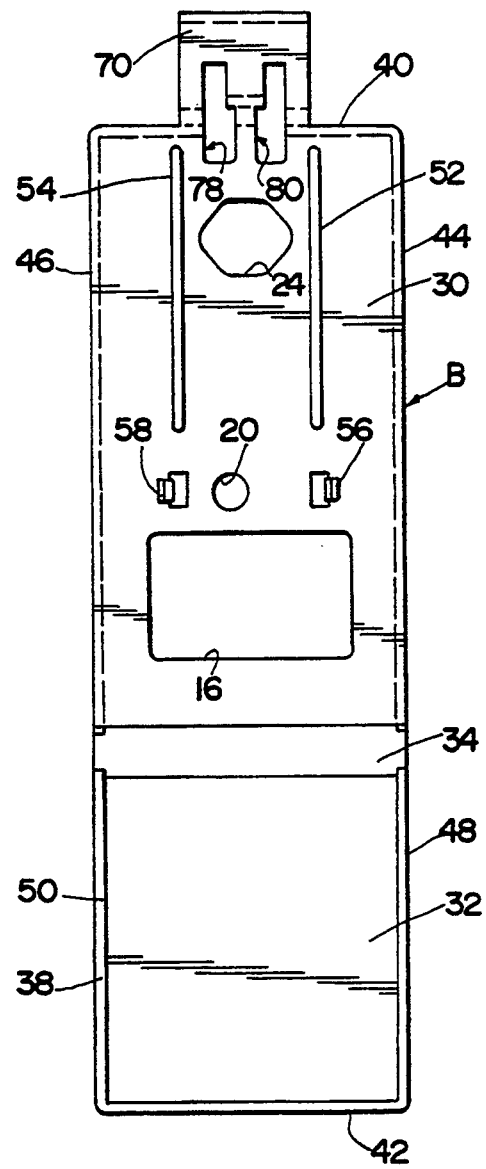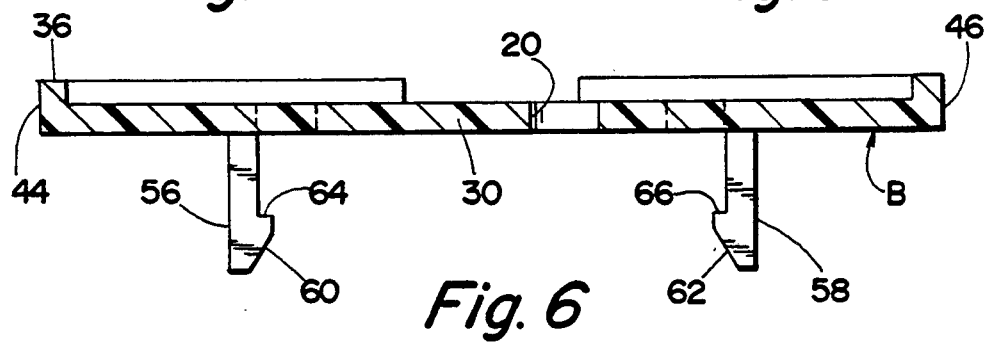

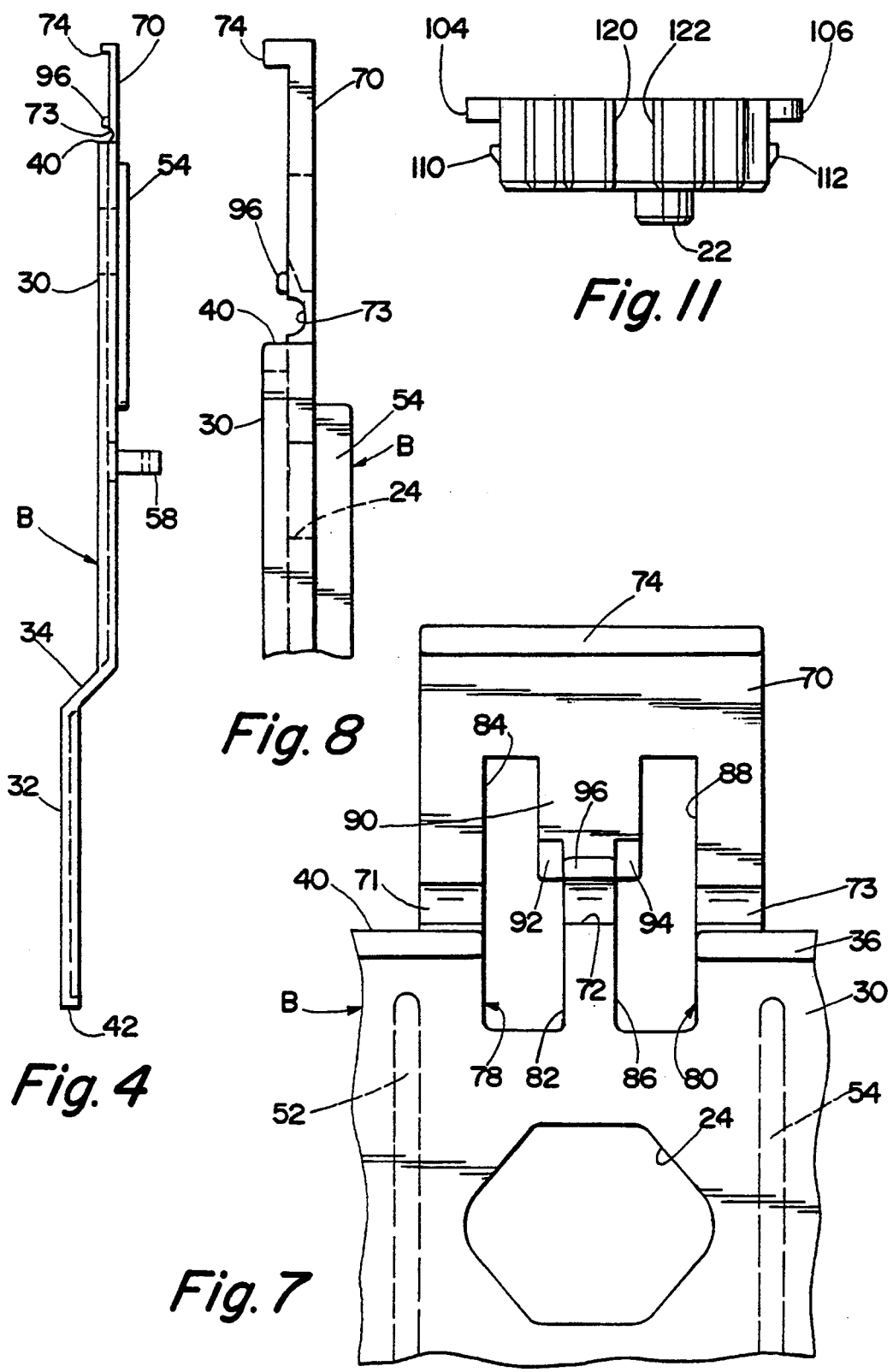

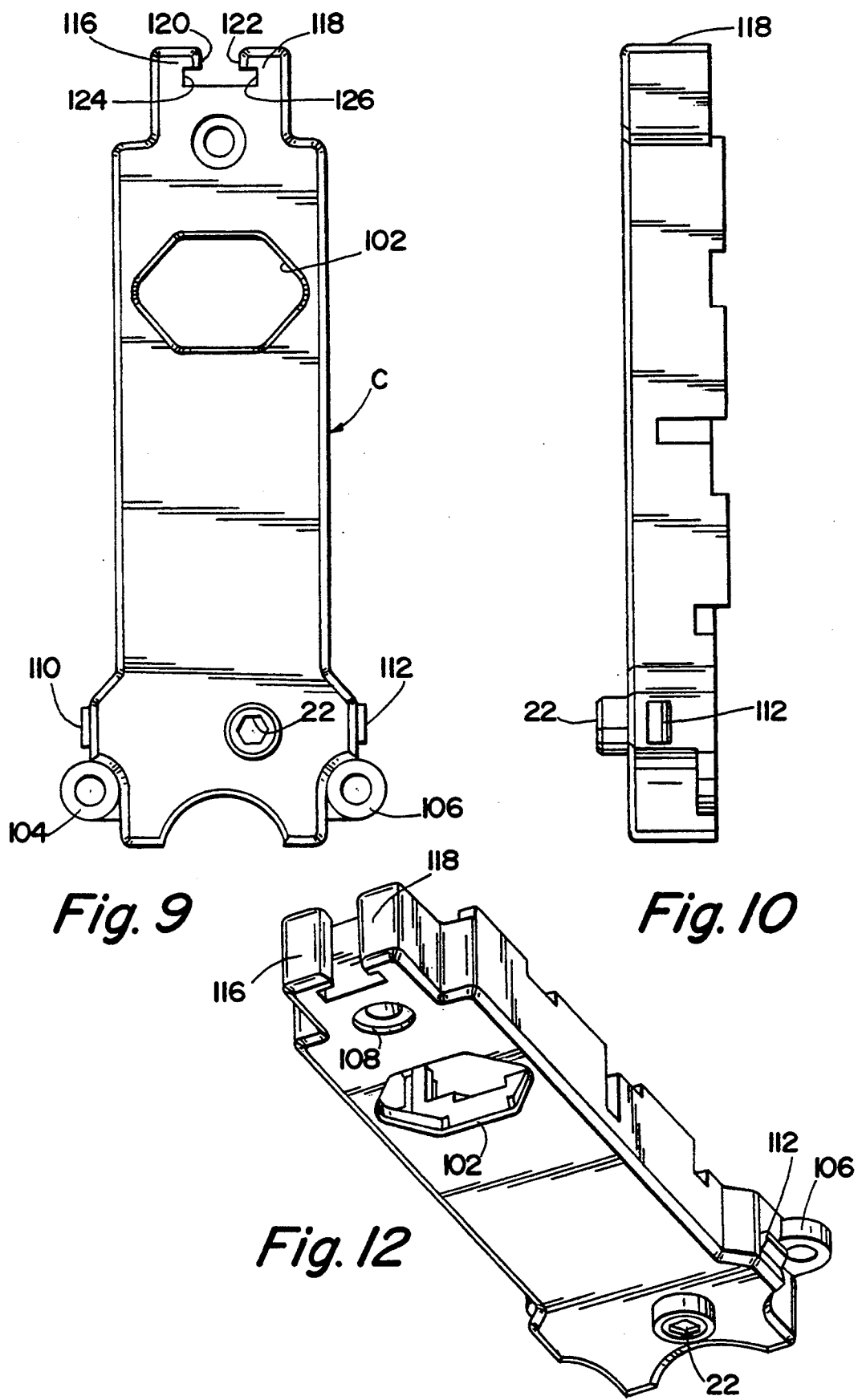

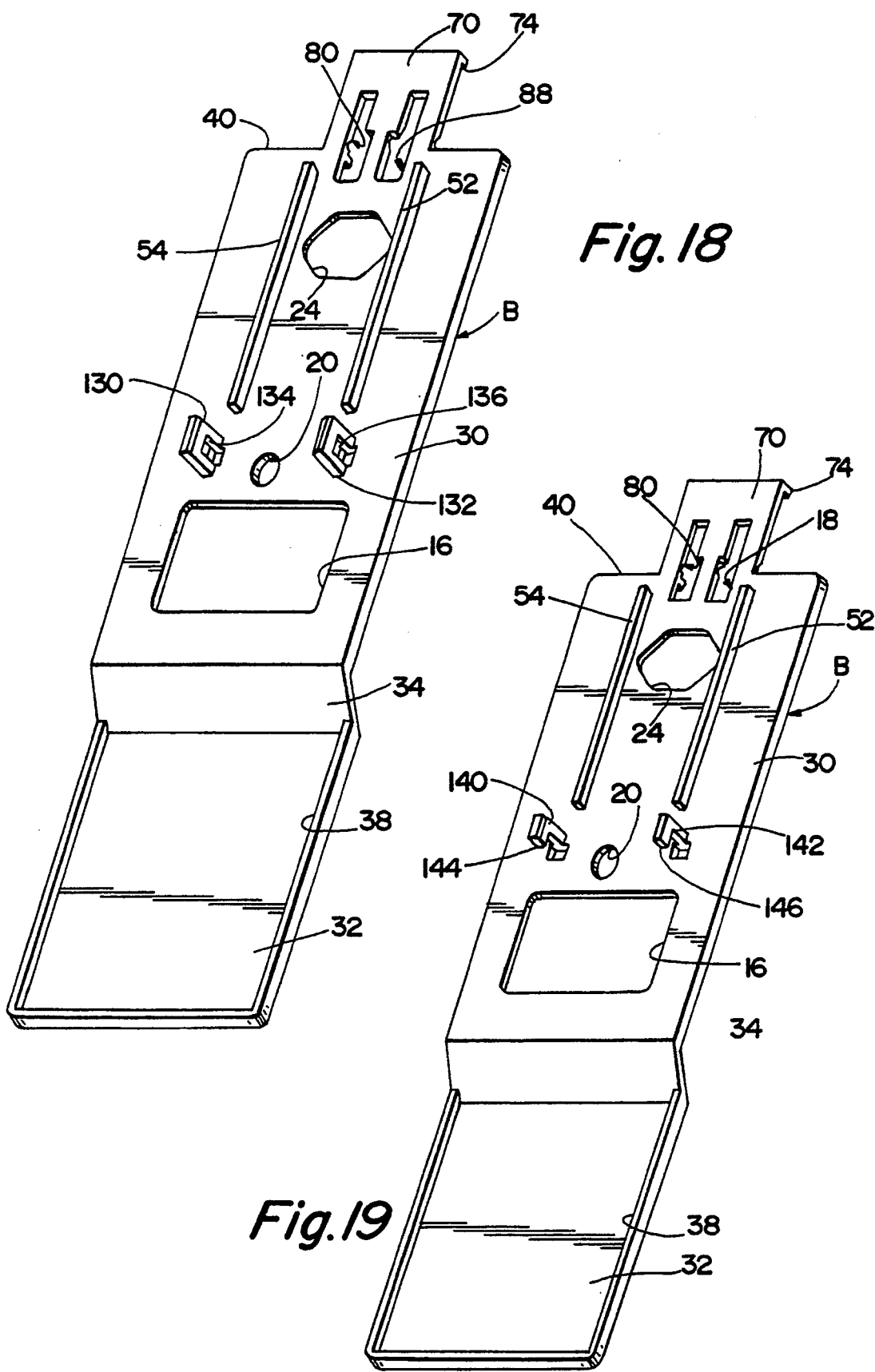

PROTECTIVE COVER FOR ELECTRIC CONTROLS

BACKGROUND OF THE INVENTION

This application relates to the art of protective covers and, more particularly, to protective covers for shielding electrical connections on electrical controls. The invention is particularly applicable for use on electric water heater controls and will be described with specific reference thereto. However, it will be appreciated that the invention has broader aspects and can be used on electrical devices in other environments.

It is common to place a plastic cover over the control on an electric water heater to prevent inadvertent human contact with live electrical connections. A variety of different ways have been developed for attaching these plastic covers to the control. In the particular application involved here, an electric heater element located beneath the control requires the plastic cover to have additional clearance. The cover of the present application provides such clearance while maintaining secure attachment to the control housing.

SUMMARY OF THE INVENTION

A protective cover of the type described has upper and lower portions separated by an offset portion that spaces the lower portion outwardly from the upper portion. The upper portion covers the electric control on a water heater while the lower portion covers the connections to an electric heater located beneath the electric control.

An enlarged opening in the upper portion closely adjacent the offset portion provides access to a temperature adjustment on the electric control. Attaching means projects rearwardly from the upper section closely adjacent the access opening. The attaching means is in the form of latches that engage latch keepers on the control housing.

A tongue on the top end of the protective cover engages lugs on the top end of the housing.

A raised bead extends around the front periphery of the upper portion and a raised bead extends around the rear periphery of the lower portion to stiffen same against bending.

It is a principal object of the present invention to provide an improved protective cover for electrical connections on water heaters.

It is also an object of the invention to provide such a cover that has improved attaching means thereon for attaching same to an electric control.

It is a further object of the invention to provide such a cover that has enhanced clearance for a heater element located beneath an electric control.

BRIEF DESCRIPTION OF THE DRAWING

FIG. 3 is a front elevational view of a protective cover constructed in accordance with the present application;

FIG. 4 is a side elevational view thereof;

FIG. 5 is a rear elevational view thereof;

FIG. 6 is a cross-sectional elevational view taken generally on line 6/6 of FIG. 3;

FIG. 7 is an enlarged partial front elevational view of the top end portion of the shield;

FIG. 8 is a side elevational view of the top portion of the cover;

FIG. 9 is a frontal elevational view of a portion of the housing for the electrical control;

FIG. 10 is a side elevational view thereof;

FIG. 11 is a top elevational view thereof;

FIG. 12 is a prospective illustration thereof;

FIG. 18 is a rear perspective illustration of a modified protective cover; and

FIG. 19 is a rear perspective illustration of still another modified cover.

DESCRIPTION OF PREFERRED EMBODIMENTS

Figure 1:
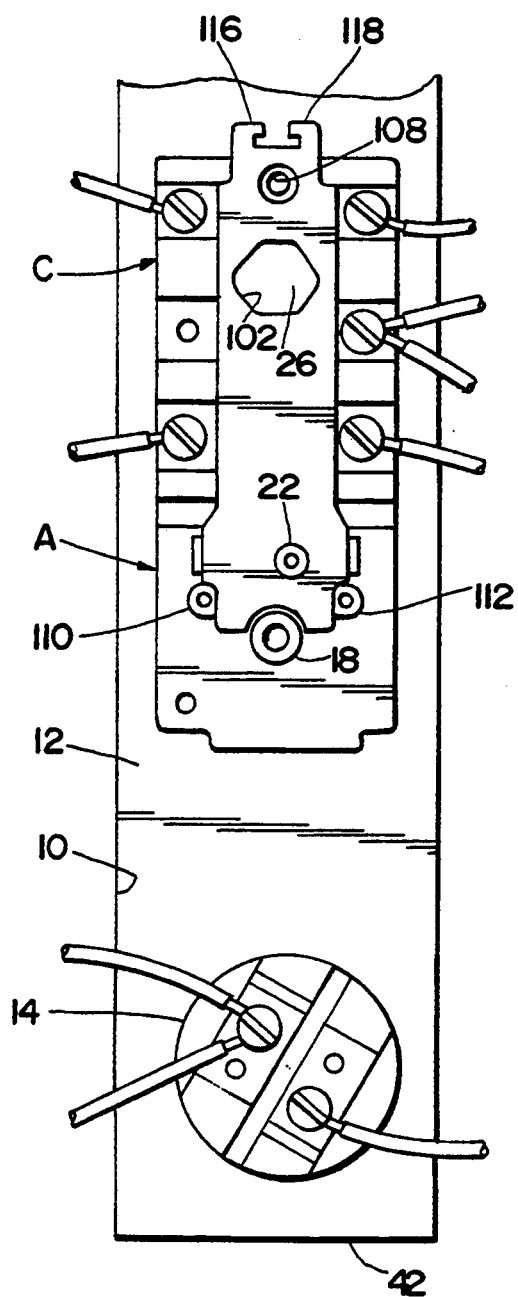
FIG. 1 is a front elevational view of an electric control and heater element to be shielded by the protective cover of the present application.

Referring now to the drawing, wherein the showings are for purposes of illustrating certain preferred embodiments of the invention only and not for purposes of limiting same, FIG. 1 shows an opening 10 of a water heater housing that surrounds a water tank 12 on which an electric control A and an electric heater 14 are mounted.

Figure 2:
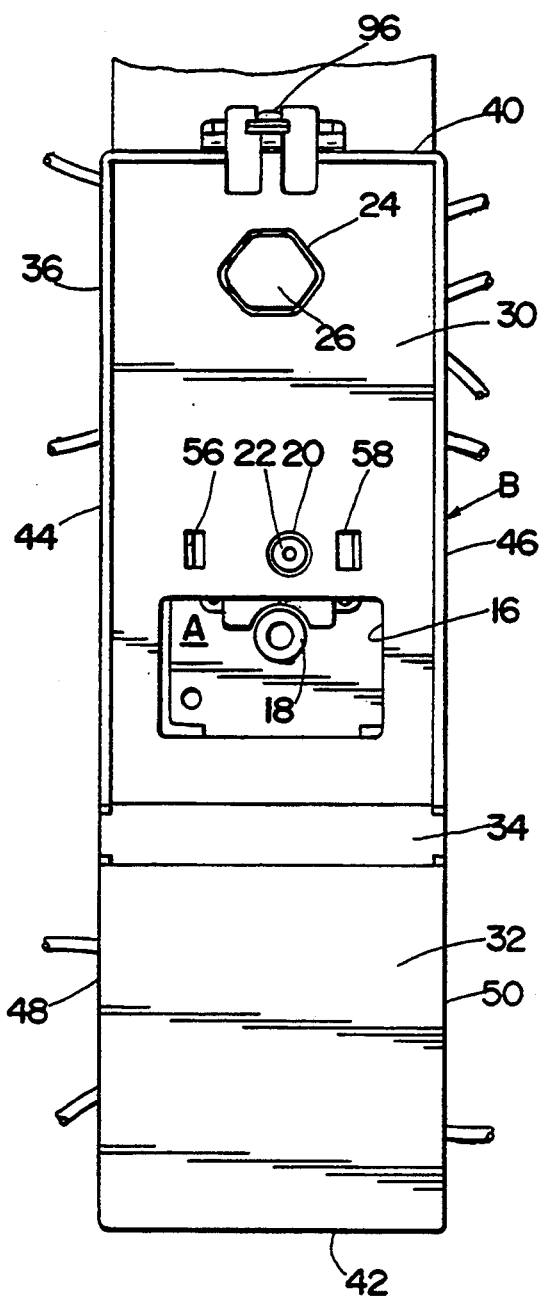
FIG. 2 is a view similar to FIG. 1 with the protective cover of the present application mounted in a shielding position over the electric control and heater element of FIG. 1.

FIG. 2 shows the protective cover B of the present application installed over the electric control and electric heater of FIG. 1 for shielding the electrical connections against inadvertent contact by a person. An enlarged rectangular opening 16 in cover B provides access to a temperature adjusting knob 18 on control A. A small circular hole 20 in cover B above opening 16 accommodates a boss 22 that receives a calibration screw on control A. An opening 24 in cover B adjacent the top end thereof provides access to a reset button 26 on control A.

Cover B is made in one-piece of dielectric plastic material. Shield B includes a substantially planar upper portion 30 and a substantially planar lower portion 32. Upper and lower portions 30, 32 are integrally connected and separated from one another by an inclined offset portion 34 that spaces lower portion 32 outwardly from upper portion 30.

A raised bead 36 extends around the front periphery of upper portion 30 and a raised bead 38 extends around the rear periphery of lower portion 32. Beads 36, 38 stiffen upper and lower portions 30, 32 against bending.

Temperature adjustment access opening 16 is located closely adjacent offset portion 34 and spaced slightly thereabove. Shield B has top and bottom ends 40, 42. Upper portion 30 has opposite sides 44, 46 and lower portion 32 has opposite sides 48, 50. Shield B is substantially rectangular, and upper portion 30 has a length that is slightly less than two times the length of lower portion 32.

A pair of spaced-apart vertical beads 52, 54 on the rear surface of upper portion 30 on opposite sides of reset button opening 24 provide increased resistance against bending of shield B and also help locate Cover B on electric control A.

Attaching means projecting rearwardly from upper portion 30 of cover B comprises a pair of spaced-apart latches, 56, 58 having inclined cam surfaces 60, 62 and latch hooks 64, 66. Latches 56, 58 are located closely adjacent the upper end of access opening 16 and spaced slightly thereabove as shown in FIGS. 3 and 5.

A centrally located tongue 70 projects from top end 40 of cover B. Tongue 70 has a substantially reduced thickness along lines 71, 72 and 73 adjacent top end 40 of cover B to define an integral hinge that allows bending of tongue 70 relative to cover B. A raised bead 74 extends outwardly from the front surface of tongue 70 along the terminal end thereof.

A pair of spaced-apart generally keyhole-shaped openings 78, 80 extend from the upper portion of cover B across the hinge line and into tongue 70. Opening 78 has a large width portion 82 and a small width portion 84, while opening 80 has a large width portion 86 and a small width portion 88. Large width portions 82, 86 extend from the upper portion of shield B across the hinge line defined by lines of reduced thickness 71, 73. Reduced width portions 84, 88 extend from the hinge line defined by lines of reduced thickness 71, 73 toward the terminal end of tongue 70. A shelf portion 90 on tongue 70 separates reduced width opening portions 84, 88. The front end of shelf portion 90 adjacent hinge line 72 has opposite inclined cam surfaces 92, 94 thereon separated by a raised bead 96.

FIGS. 9-12 show a front housing C that is part of control A in FIG. 1. Housing C has an opening 102 therein for reset button 26 of FIG. 1. Apertured ears 104, 106 and a countersunk hole 108 are provided on housing C for receiving fasteners to attach housing C to the control. Latch keepers 110, 112 extend outwardly from opposite sides of housing C adjacent the bottom end thereof for cooperation with latches 56, 58 of FIG. 6. The latch keepers have rearwardly inclined front cam surfaces for cooperation with cam surfaces 60, 62 on latches 56, 58 of FIG. 6.

A pair of upwardly extending lugs, 116, 118 are provided on the top end of housing C. Lugs 116, 118 include inwardly projecting flanges 120, 122 that provide laterally undercut openings 124, 126.

The width of each lug 116, 118 at the outer end thereof is approximately the same as the width of wide opening portions 82, 86 in FIG. 7. The length of lugs 116, 118 from front-to-back of housing C is approximately the same as the length of wide opening portions 82, 86. The width of lugs 116, 118 across undercut portions 124, 126 thereof is approximately the same as narrow width opening portions 84, 88. The length of lugs 116, 118 from front-to-back thereof along undercut portions 124, 126 thereof is approximately the same as the length of narrow width opening portions, 84, 88.

Figure 13:
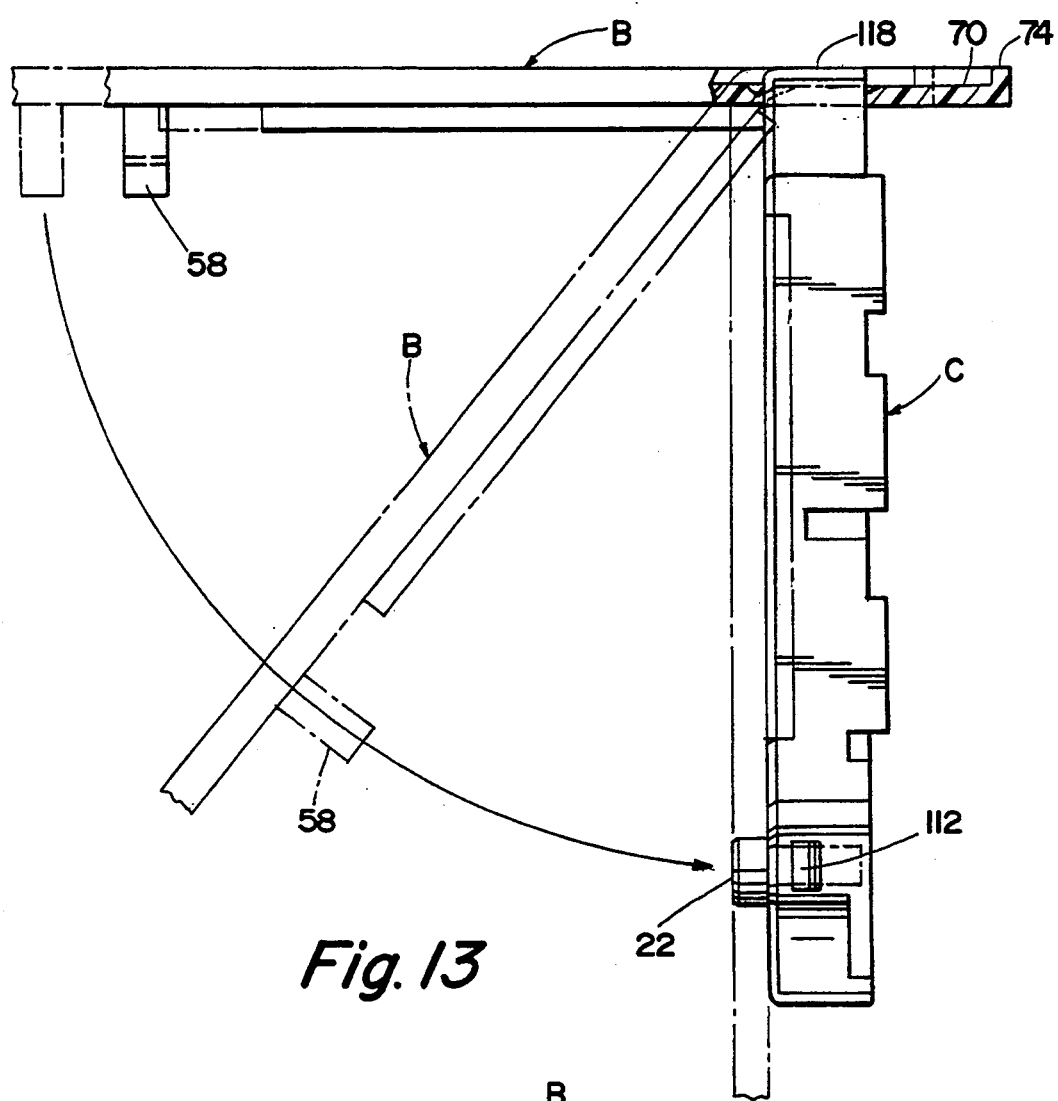
FIG. 13 is a side elevational view showing how the cover is attached at its top end to the electric control housing.
Figure 14:
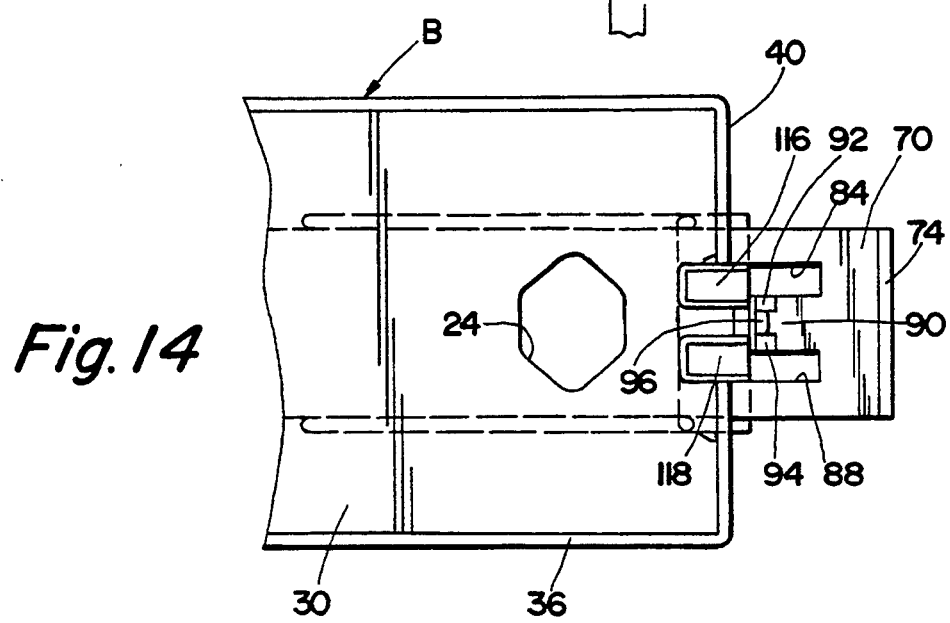
FIG. 14 is a partial top elevational view showing the top end portion of the cover positioned over lugs at the top end of the electric control housing.
Figure 15:
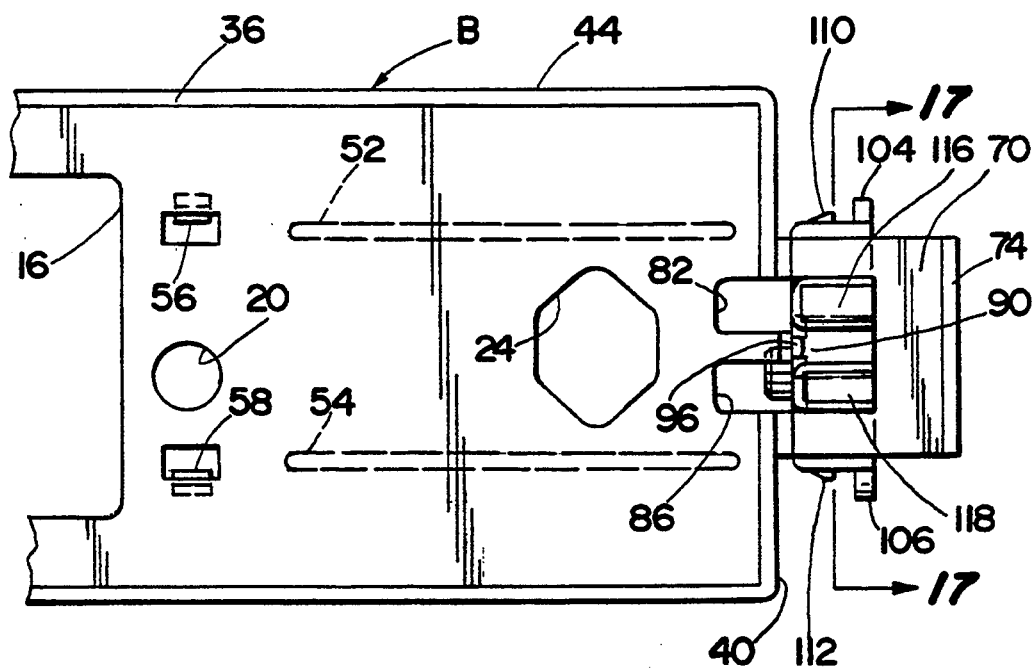
FIG. 15 is a view similar to FIG. 14 showing the shield after it has been moved to the left for interlocking the top end portion thereof beneath lugs on the electric control housing.
Figure 16:
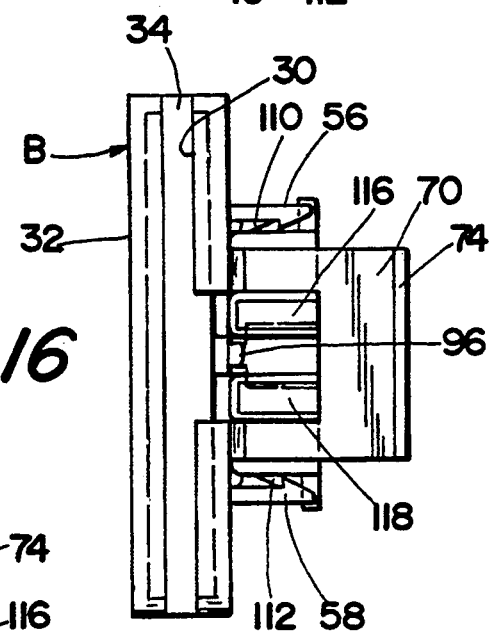
FIG. 16 is a top plan view of the cover in installed position.

To install cover B, it is positioned horizontally with tongue 70 above lugs 116, 118 on housing C. The shield is then manipulated and lowered until lugs 116, 118 are received in wide width opening portions 82, 86. Cover B is then pulled to the left in FIGS. 13 and 14. Cam surfaces 92, 94 on shelf portion 90 of tongue 70 assist movement of shelf portion 90 beneath lug flanges 120, 122 so that undercut portions 124, 126 of lugs 116, 118 will be received within narrow width openings 84, 86. Bead 96 on the forward end portion of shelf portion 90 is received between lugs 116, 118 to guide movement of the tongue. Cover B is then positioned as shown in FIG. 15. Downward swinging portion of Cover B as shown by shadow lines in FIG. 13 then moves cover B to the positions shown in FIGS. 2 and 16.

Figure 17:
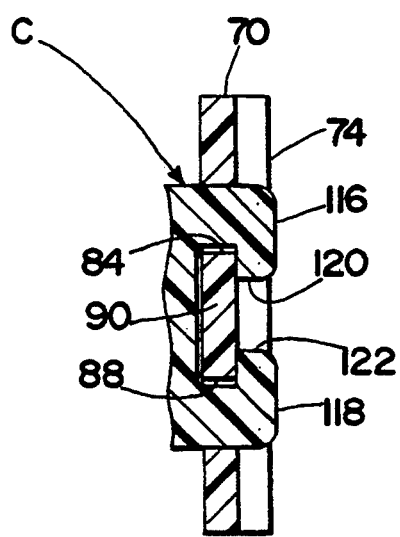
FIG. 17 is a partial cross-sectional elevational view taken generally on line 17—17 of FIG. 15.

FIG. 17 clearly shows the opposite side portions of shelf portion 90 on tongue 70 trapped beneath flanges 120, 122 on lugs 116, 118. As cover B swings downwardly to a vertical position, the cam surfaces 60, 62 on latches 56, 58 engage corresponding cam surfaces on latch keepers 110, 112. Latches 56, 58 then bend outwardly away from one another until latch projections 64, 66 snap behind the latch keepers 110, 112 to attach cover B to the control.

FIG. 18 shows another arrangement wherein the latches comprise generally U-shaped loops, 130, 132 extending rearwardly from upper portion 30 of cover B. The ends or U-shaped loops 130, 132 are integrally connected with the rear surface of upper portion 30. Horizontally extending openings 134, 136 in latch members 130, 132 are adapted to receive latch keepers 110, 112 on housing C of control A.

FIG. 19 shows another arrangement wherein the latches comprise hooks, 140, 142 extending rearwardly from the rear surface of upper portion 30 and having downwardly extending hook portions 144, 146 for reception behind latch keepers 110, 112 on housing C of Control A or for reception in sockets provided on housing C to replace latch keepers 110, 112.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A protective cover for electrical controls, said cover having a stepped front surface defined by substantially planar upper and lower portions that are offset from one another at an offset portion that spaces said lower portion outwardly from said upper portion, and an enlarged aperture in said upper portion adjacent said offset portion for providing access to a control adjustment.

2. The cover of claim 1 wherein said offset portion is inclined outwardly and downwardly from said upper portion.

3. The cover of claim 1 wherein said upper and lower portions have front and back surfaces, a peripheral rim projecting outwardly from said front surface of said upper portion, and a peripheral rim projecting outwardly from said back surface of said lower portion.

4. The cover of claim 1 including attaching means projecting rearwardly from said upper portion adjacent said aperture for attaching said cover to a control.

5. The cover of claim 4 wherein said attaching means comprises a plurality of spaced-apart latches above said aperture.

6. The cover of claim 1 wherein said upper portion has a top end, a tongue projecting from said top end and being integrally connected thereto by a living hinge for permitting bending of said tongue relative to said cover, and said tongue having an opening therethrough that extends across said hinge and into said cover adjacent said top end thereof.

7. The cover of claim 1 wherein said upper portion has front and back surfaces and a top end, and a plurality of spaced-apart stiffening ribs extending along said back surface between said aperture and said top end.

8. A protective cover for electrical controls, said cover having top and bottom ends, opposite sides and front and back surfaces, a tongue projecting from said top end and being integrally connected thereto by a living hinge for permitting bending of said tongue relative to said cover, and said tongue having an opening therethrough that extends across said hinge and into said cover adjacent said top end thereof.

9. The cover of claim 8 wherein said tongue has a front surface and a free end, and a rib projecting outwardly from said front surface of said tongue along said free end thereof.

10. The cover of claim 8 wherein said tongue has a free end, said opening being substantially narrower adjacent said free end compared to the width of said opening adjacent said hinge.

11. The cover of claim 8 including an enlarged aperture in said cover intermediate said top and bottom ends for providing access to a control adjustment.

12. The cover of claim 11 including a pair of spaced-apart latches projecting rearwardly from said cover adjacent said aperture.

13. The cover of claim 8 wherein said opening comprises a pair of spaced apart openings.

* * * * *